Sept. 5, 1950     R. H. POTTS ET AL     2,521,602
HYDROGENATING AND DEODORIZING EDIBLE OILS
Filed Feb. 23, 1945
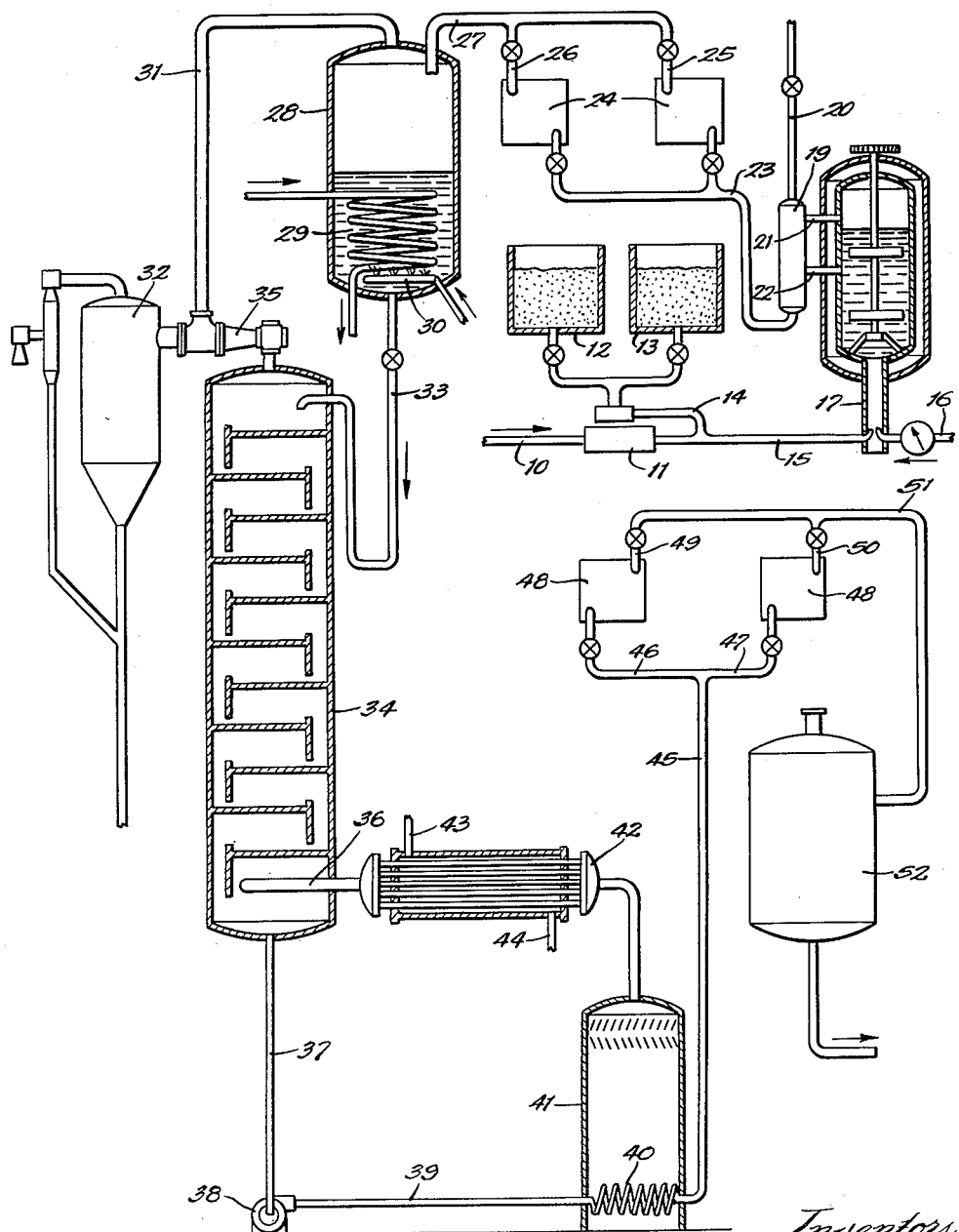
Inventors:
Ralph H. Potts and
Charles E. Morris,
By Carl C. Batz
Attorney.

Patented Sept. 5, 1950

2,521,602

UNITED STATES PATENT OFFICE 2,521,602

HYDROGENATING AND DEODORIZING EDIBLE OILS

Ralph H. Potts, La Grange, and Charles E. Morris, Chicago, Ill., assignors to Armour and Company, Chicago, Ill., a corporation of Illinois Application February 23, 1945, Serial No. 579,464

6 Claims. (Cl. 260—409)

This invention relates to treating edible oils and the like. The new method will be found applicable to other uses. The present application constitutes a continuation-in-part of our copending application Serial No. 425,284, now abandoned, filed January 1, 1942, for Treating Edible Oils.

In the hydrogenation of edible oils through the use of removable catalysts, as now commonly practiced, the oil is mixed with the catalyst, hydrogenated under elevated temperatures and pressures, chilled and then filtered. Subsequently, the filtered stock is re-heated to deodorize it. The oil has to be cooled before the filtering stage because it is found that when heated oil containing the catalyst is brought into contact with air, discoloration of the oil results.

An object of the present invention is to provide a method wherein the operation may be carried on continuously without interruption and wherein the heat resulting from the hydrogenation operation is utilized later in the deodorizing steps. A further object is to provide a continuous process in which the dissolved hydrogen carried by the oil leaving the hydrogenation unit is released under vacuum in the deodorizing step for the removal of impurities. A further object is to provide a process in which hydrogenation, filtering out the removable catalyst and deodorizing of the oil, is accomplished in a continuous operation with a saving in heat and with the carrying over of the results of one operation into a subsequent operation to aid the latter.

Another object of the invention is to provide for the selective hydrogenation of oils and similar materials so as to produce a substantially uniform product in which only partial hydrogenation is accomplished. Still a further object is to provide for the hydrogenation of the stock by reacting the stock in the liquid phase with hydrogen in the presence of a removable catalyst.

Other specific objects and advantages will appear as the specification proceeds.

The invention is illustrated, in a preferred embodiment, by the accompanying drawing in which the single figure represents, diagrammatically, apparatus suitable for carrying out the process.

Broadly, the invention comprises a continuous process involving continuous hydrogenation and including mixing an edible oil or other suitable charging material with a catalyst which may be removed by filtration, hydrogenating the oil under elevated temperatures and pressures and in the presence of the catalyst, passing the hot oil into a degassing tank where under reduced pressure and elevated temperature, the dissolved hydrogen within the oil is removed, carrying with it impurities in the oil. The oil is further treated by heat and steam to strip off the volatile odoriferous fractions. The catalyst is removed by filtration at any desired point. The final product may be chilled and packaged.

In the invention, the oil or other suitable charging stock is mixed with a catalyst to form a substantially uniform and homogeneous mixture of catalyst and oil, and this mixture is passed in a stream into a zone where it is treated with hydrogen to accomplish the hydrogenation.

As a specific illustration of the method, the following may be stated in connection with the apparatus illustrated. The oil enters pipe 10 under the influence of the proportioning pump 11. Catalysts contained within the tanks 12 and 13 are passed through pipe 14 into the line 15. The catalyst may be any suitable material adapted to be removed by filtration. Since such catalysts are well known, a detailed description is not needed. As a specific example, nickle catalyst may be employed.

Hydrogen is introduced through the line 16. The hydrogen and oil pass upwardly through pipe 17 into the jacketed hydrogenator 18, which is of well-known construction. Communicating with the interior of the hydrogenator 18 is a tank 19 provided with a vent pipe 20. The tank 19 communicates with the hydrogen space in the hydrogenator through the overflow pipe 21 and with the liquid space in the hydrogenator through the overflow pipe 22.

The substantially uniform mixture of oil and catalyst is thus passed in a stream into the hydrogenator and subjected substantially uniformly to treatment with hydrogen to perform the selective hydrogenation of the material. The reaction is a reaction between the oil and the liquid phase and the hydrogen.

Instead of passing the mixed oil and catalyst directly into the hydrogenator, we can introduce this mixture to a heated vacuum chamber to remove moisture and gases and then pass the deaerated material into the hydrogenator.

From the hydrogenator, the oil flows through closed line 23 to the filters 24, which exclude air. Though filters of this type may be slightly more inconvenient in operation, we have found that filters of this type play an important part in our new process.

From the filters, the oil flows through the valve-controlled lines 25 and 26 in line 27, which opens into the top portion of the degassing tank 28.

The lower portion of the tank 28 is provided with a heating coil 29 through which a heating fluid, such as a mixture of diphenyl and diphenyl oxide, or any other suitable heating fluid may be passed to heat the oil. Also, the bottom portion of the tank 29 is provided with a steam pipe 30 through which steam may be introduced into the oil. Degassing tank 28 is maintained under reduced pressures by the vacuum line 31 which leads to a barometric condenser 32. Since the barometric condenser 32 and the associated vacuum pumps are of well-known construction, a detailed description is believed unnecessary.

Oil leaving the degassing tank 28 passes through the valve-controlled pipe 33 into the deodorizing column 34. The deodorizing column 34 is also maintained under reduced pressure by a pipe connection 35 leading to the barometric condenser 32. The oil is introduced into the top portion of the stripping or deodorizing column 34 and it flows downwardly over successive baffles to the bottom of the tower, meeting as it descends a counter-flow of steam which assists in the removal of the undesirable volatile fractions. The steam is introduced into the bottom of the column through pipe 36.

Oil leaving the column 34 passes through line 37, pump 38 and pipe 39 into a coil 40 in the lower portion of a steam generator 41. Heat is withdrawn from the coil 40 to form steam and the steam after leaving the generator is superheated in the heat exchange unit 42, the heating fluid being passed through lines 43 and 44.

The oil leaving the coil 40 in the heat exchanger passes through pipe 45 and branched valve-controlled lines 46 and 47 into the filters 48 where any remaining unremoved portions of the catalysts are recovered. The oil then passes through valved lines 49 and 50 and the conduit 51 into the holding tank 52 from which it is withdrawn for chilling and packaging.

Temperature and pressure conditions in the various parts of the apparatus may vary considerably. In the specific illustration given, the oil was introduced through supply line 10 at a temperature of 150° F. In the hydrogenator, the temperature was in the neighborhood of 300° F. and the pressure varied from 20 to 75 pounds. The pressure extended beyond the filters 24 to the pressure valves in lines 25 and 26 and was in the neighborhood of from 3 to 5 pounds at these points.

Within the degassing tank, the pressure was reduced below 50 mm. of mercury and preferably was about one inch mercury absolute. The temperature within the degassing tank was in the neighborhood of 400° F. While it is desirable to have the pressure extend through the filters 24, as already described, and even through filters 48, it will be understood that such pressure may not be necessary.

In the operation of the process, the mixed catalyst and oil, together with the introduced hydrogen, are brought into the hydrogenator 18 in which hydrogenation occurs, a considerable quantity of hydrogen dissolving, as free hydrogen, in the oil. Hydrogen is permitted to escape when this is desired, through the valve-controlled line 20. The heated oil passes through the continuous filters 24, pressure being reduced to atmospheric within the filters or slightly beyond. We prefer to hold a slight amount of back pressure upon the filters by means of the valves in lines 25 and 26. These valves serve a very important function in connection with the closed type of filters used in this process in that they serve to prevent the reduced pressure maintained in the degassing tank 28 from extending into the filters, thus avoiding the possibility of air leading into the filters from the outside. The oil leaving the filters and with its contained hydrogen passes through line 27 into the tank 28. Here the pressure is very sharply reduced so that the hydrogen is free to escape, together with the impurities carried by it. In addition, heat and steam are employed to further remove volatile material. A counter-current stripping action is carried on within column 34 which is also maintained under reduced pressure and where superheated steam is utilized. A further filtration may be carried on within the filters 48. This filtration step may be found to be unnecessary and may be omitted. If desired, the first filtration step in which filters 24 are employed may be omitted and the filtration accomplished solely in filters 48. Throughout the entire process, air is excluded from the apparatus, the apparatus being maintained alternately under pressure and partial vacuum.

In the operation in which the filters 24 are omitted and the filtration performed solely by the final filters 48, it is found that more satisfactory results are obtained. The filters 48 eliminate not only the catalyst, but also impurities, so that the product is then passed directly through the conduit 51 to storage tank 52 without being brought into contact with the air. From the tank 52, the product is preferably passed into a continuous chilling and texturating device and filled into containers which are hermetically sealed without being brought into contact with air. Thus, the entire operation from the hydrogenation step through to the packaging of the final product is carried out in the absence of air.

After the hydrogenation operation, the stream of liquid containing the absorbed free hydrogen may be passed directly to the heated and steam-equipped tank 28, or, if desired, passed directly to the deodorizing tank 34 and heat and steam employed therein for stripping the oil of the undesirable fractions.

By maintaining the oil in the hydrogenator 18 under substantial pressure created by the hydrogen atmosphere, a substantial amount of free hydrogen is absorbed, and when subsequently the stream of oil is passed into tank 28 and heat supplied thereto, the hydrogen, under the influence of the heat and the reduced pressure existing in chamber 28, is freed, carrying with it the absorbed impurities and odoriferous material. The influence of the heat and steam brings about a liberation of the absorbed free hydrogen and the odoriferous material carried by it. This function is performed whether the hydrogenated material be passed into chamber 28 or directly into the tower 34.

The foregoing process in which the oil is saturated with hydrogen gas as it enters the degassing chamber or deodorizing tower and is therein subjected to heat and reduced pressure, results in a product having a much improved color, flavor, and stability. All of the reasons for the improvement, from a chemical standpoint, are not fully understood. It may be that the organic impurity is in a reduced state and in this condition would naturally be more volatile than it would be when oxidized. It is therefore much more easily removed from the oil by the steam deodorization process than it would be if allowed to oxidize by contact with air after the hydrogenation step and before deodorization, as is usual in ordinary batch practice.

By reason of the treatment of the liquid phase uniform mixture of oil and catalyst with the hydrogen and the uniformity of the reaction, the oil may be selectively hydrogenated so that the linoleic acid is saturated to the extent necessary to form oleic acid without hydrogenating oleic acid to stearic acid to any substantial extent. The uniformity of the reaction also aids in obtaining uniform temperatures throughout the reaction mixture and thus helps in controlling the hydrogenation reaction and also makes it possible to control the tendency of oleic acid to be converted at high temperatures from the cis to the trans form. The resultant product is substantially uniform and homogeneous.

While in the foregoing description of the process, we have set forth certain steps and conditions a desirable in the specific illustrations, it will be understood that such conditions and steps may be varied or carried on in different sequences without departing from the spirit of our invention. We do not desire to be limited to the exact details of construction shown and described, for obvious modifications will occur to those skilled in the art.

We claim:

1. In a continuous process for treating edible oils, the steps of continuously introducing the oil and a removable hydrogenating catalyst into a hydrogenating zone under a pressure of about 20 to 75 pounds, introducing hydrogen in substantial excess of that required for hydrogenation under the pressure in said zone to cause a considerable amount of free hydrogen to be absorbed in said oil, heating the oil within said zone to a reactive temperature for hydrogenation, continuously passing the hydrogenated oil while still hot and out of contact with the outside atmosphere to a pressure release zone, subjecting the oil containing free hydrogen in said pressure release zone to heat and pressure below atmospheric to liberate said absorbed free hydrogen and odoriferous materials carried therewith from the oil, and withdrawing a continuous stream of oil from said pressure release zone.

2. In a continuous process for treating edible oils, the steps of continuously introducing oil and a removable hydrogenating catalyst into a hydrogenating zone under super atmospheric pressure in the neighborhood of 75 pounds, introducing hydrogen substantially in excess of that required for hydrogenation to cause a considerable amount of free hydrogen to be absorbed within said oil under the pressure therein, heating the oil within said zone to a reactive temperature for hydrogenation, continuously passing the hydrogenated oil out of contact with the outside atmosphere in a confined stream to a pressure release zone, subjecting the oil in said pressure release zone to a temperature in the neighborhood of 400° F. to pressure below atmospheric to liberate said absorbed free hydrogen and odoriferous materials carried therewith from the oil, and withdrawing a continuous stream of oil from said pressure release zone.

3. In a continuous process for treating edible oils, the steps of continuously introducing the oil and a removable hydrogenating catalyst into a hydrogenating zone to provide a mixture of oil and catalyst in said zone, maintaining said zone under pressure of about 20 to 75 pounds, introducing hydrogen in substantial excess of that required for hydrogenation to cause said excess of hydrogen to be absorbed in said oil under said pressure, heating the oil within said zone to a reactive temperature for hydrogenation, continuously filtering the hydrogenated oil in a confined zone out of contact with the outside atmosphere to remove the catalyst, continuously passing the filtered hydrogenated oil still out of contact with the outside atmosphere and while still hot to a pressure release zone, and subjecting the oil in said pressure release zone to pressure below atmospheric to liberate absorbed free hydrogen and odoriferous materials in the oil carried thereby, and withdrawing a continuous stream of oil from said pressure release zone.

4. In a continuous process for treating edible oils, the steps of continuously introducing the oil and a granular catalyst into a hydrogenating zone from which air is excluded to provide a mixture of oil in catalyst in said zone, maintaining said zone under a pressure of about 75 pounds per square inch, introducing hydrogen into said zone in substantial excess of that required for hydrogenation to cause free hydrogen to be absorbed in said oil under said pressure, heating the oil to a reactive temperature for hydrogenation, continuously filtering the hydrogenated oil in a confined stream out of contact with outside atmosphere to remove the catalyst, continuously passing the filtered hydrogenated oil while still out of contact with outside atmosphere and while still hot to a pressure release zone, and subjecting the oil containing said free hydrogen in said pressure release zone to pressure below atmospheric and in the absence of air for the liberation of said absorbed free hydrogen and odoriferous materials carried thereby in the oil, and withdrawing the oil from said pressure release zone.

5. In a continuous process for treating edible oils, the steps of continuously introducing the oil and a removable hydrogenating catalyst into a hydrogenating zone under a pressure of about 20 to 75 pounds, introducing hydrogen in substantial excess of that required for hydrogenation to cause the same to be absorbed in said oil under said pressure, heating the oil within said zone to a temperature of about 300° F., continuously passing the hydrogenated oil while still hot and out of contact with the outside atmosphere to a deodorizing zone, reducing the pressure in said deodorizing zone below 50 mm. of mercury to liberate said absorbed free hydrogen and the odoriferous material carried therewith from the oil, and withdrawing a continuous stream of oil from said deodorizing zone.

6. In a continuous process for hydrogenating of edible oils and the deodorizing thereof, the steps of continuously introducing the oil and a removable hydrogenating catalyst into a hydrogenation zone under a pressure of about 20 to 75 pounds, introducing hydrogen in substantial excess of that required for hydrogenation to cause the same to be absorbed in said oil under said pressure, heating the oil within said zone to a reactive temperature for hydrogenation, continuously passing the hydrogenated oil while still hot to a deodorizing zone, reducing the pressure in said deodorizing zone to about 1" mercury absolute to liberate said absorbed free hydrogen and odoriferous material carried therewith from the oil, and withdrawing a continuous stream of oil from said deodorizing zone.

RALPH H. POTTS.
CHARLES E. MORRIS.

REFERENCES CITED

The following references are of record in the file of this patent:

UNITED STATES PATENTS

| Number | Name | Date |
|---|---|---|
| 2,207,712 | Blaso | July 16, 1940 |
| 2,307,065 | Paterson | Jan. 5, 1943 |
| 2,351,832 | Neal | June 20, 1944 |
| 2,365,045 | Borkowski | Dec. 12, 1944 |

OTHER REFERENCES

Dean, "Utilization of Fats," pages 123 and 124, Harvey, London, 1938.

Brocklesby, "The Chemistry and Technology of Marine Animal Oils," Fisheries Research Board of Canada, Bulletin LIX, page 280, 1941.